US011621833B2

(12) United States Patent
Wright et al.

(10) Patent No.: US 11,621,833 B2
(45) Date of Patent: Apr. 4, 2023

(54) SECURE MULTIPARTY LOSS RESISTANT STORAGE AND TRANSFER OF CRYPTOGRAPHIC KEYS FOR BLOCKCHAIN BASED SYSTEMS IN CONJUNCTION WITH A WALLET MANAGEMENT SYSTEM

(71) Applicant: nChain Licensing AG, Zug (CH)

(72) Inventors: Craig Steven Wright, London (GB); Stephane Savanah, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 16/875,796

(22) Filed: May 15, 2020

(65) Prior Publication Data
US 2020/0280433 A1  Sep. 3, 2020

Related U.S. Application Data

(60) Division of application No. 16/111,022, filed on Aug. 23, 2018, now Pat. No. 10,659,223, which is a
(Continued)

(30) Foreign Application Priority Data

| Feb. 23, 2016 | (GB) | 1603117 |
| Mar. 24, 2016 | (GB) | 1605026 |
| Nov. 15, 2016 | (GB) | 1619301 |

(51) Int. Cl.
*H04L 9/08* (2006.01)
*G06Q 20/36* (2012.01)
(Continued)

(52) U.S. Cl.
CPC ......... *H04L 9/085* (2013.01); *G06Q 20/3678* (2013.01); *G06Q 20/3829* (2013.01);
(Continued)

(58) Field of Classification Search
CPC ..... H04L 9/085; H04L 9/3066; H04L 9/0825; H04L 9/0861; H04L 9/0894;
(Continued)

(56) References Cited

U.S. PATENT DOCUMENTS

| 5,535,276 A | * | 7/1996 | Ganesan | ............... H04L 9/0825 380/46 |
| 5,600,725 A | | 2/1997 | Rueppel et al. | |

(Continued)

FOREIGN PATENT DOCUMENTS

| AU | 2016100059 A4 | 3/2016 |
| CA | 2867765 A1 | 4/2016 |

(Continued)

OTHER PUBLICATIONS

"Bitcoin Developer Guide," Bitcoin Project, https://web.archive.org/web/20160515171209/https://bitcoin.org/en/developer-guide, May 15, 2016 [retrieved Mar. 13, 2019], 55 pages.
(Continued)

*Primary Examiner* — Aravind K Moorthy
(74) *Attorney, Agent, or Firm* — Davis Wright Tremaine LLP

(57) ABSTRACT

A solution for controlling access to a resource such as a digital wallet implemented using a blockchain. Use of the invention during set-up of the wallet can enable subsequent operations to be handled in a secure manner over an insecure channel. An example method comprises splitting a verification element into multiple shares; determining a common secret at multiple nodes in a network; and using the common secret to transmit a share of the verification element between nodes. The shares can be split such that no share is sufficient to determine the verification element and can be stored at separate locations. Upon share unavailability, the share can be retrieved a location accessibility. For safe transmission of
(Continued)

US 11,621,833 B2

Page 2 the share(s), the common secret is generated at two different nodes independently and used to generate an encryption key for encrypting at least one share of the verification element to be transmitted securely.

6 Claims, 5 Drawing Sheets

Related U.S. Application Data continuation of application No. PCT/IB2017/050829, filed on Feb. 14, 2017.

(51) Int. Cl.
*G06Q 20/38* (2012.01)
*H04L 9/30* (2006.01)
*H04L 9/32* (2006.01)
*H04L 9/40* (2022.01)

(52) U.S. Cl.
CPC .......... *H04L 9/0825* (2013.01); *H04L 9/0861* (2013.01); *H04L 9/0894* (2013.01); *H04L 9/3066* (2013.01); *H04L 9/3247* (2013.01); *H04L 63/0442* (2013.01); *G06Q 2220/00* (2013.01); *H04L 9/3252* (2013.01); *H04L 2209/56* (2013.01)

(58) Field of Classification Search
CPC ............... H04L 9/3247; H04L 63/0442; H04L 9/3252; H04L 2209/56; H04L 9/08; H04L 9/0841; H04L 9/32; H04L 9/3242; G06Q 20/3678; G06Q 20/3829; G06Q 2220/00; G06Q 20/36; G06Q 20/38; G06Q 20/389
See application file for complete search history.

(56) References Cited

U.S. PATENT DOCUMENTS

| 5,761,305 | A | 6/1998 | Vanstone et al. |
| 5,867,578 | A * | 2/1999 | Brickell ................ H04L 9/3255 713/180 |
| 5,889,865 | A | 3/1999 | Vanstone et al. |
| 5,896,455 | A | 4/1999 | Vanstone et al. |
| 5,920,630 | A * | 7/1999 | Wertheimer .......... H04L 9/0894 380/45 |
| 5,933,504 | A | 8/1999 | Vanstone et al. |
| 6,061,449 | A | 5/2000 | Candelore et al. |
| 6,078,667 | A | 6/2000 | Johnson |
| 6,118,874 | A * | 9/2000 | Okamoto ............... H04L 9/0894 380/282 |
| 6,122,736 | A | 9/2000 | Vanstone et al. |
| 6,141,420 | A | 10/2000 | Vanstone et al. |
| 6,286,098 | B1 * | 9/2001 | Wenig ................. H04L 63/1425 713/151 |
| 6,490,352 | B1 | 12/2002 | Schroeppel |
| 6,618,483 | B1 | 9/2003 | Vanstone et al. |
| 6,662,299 | B1 * | 12/2003 | Price, III ................ G06F 21/31 713/171 |
| 6,704,870 | B2 | 3/2004 | Vanstone et al. |
| 6,785,813 | B1 | 8/2004 | Vanstone et al. |
| 6,792,530 | B1 | 9/2004 | Qu et al. |
| 6,819,766 | B1 * | 11/2004 | Weidong ............... H04L 9/0822 380/278 |
| 6,876,745 | B1 | 4/2005 | Kurumatani |
| 7,003,665 | B1 * | 2/2006 | Dultz .................... H04L 9/0827 380/255 |
| 7,006,633 | B1 | 2/2006 | Reece |
| 7,095,851 | B1 | 8/2006 | Scheidt |
| 7,181,017 | B1 | 2/2007 | Nagel et al. |
| 8,166,481 | B2 | 4/2012 | Dadiomov et al. |
| 8,401,185 | B1 * | 3/2013 | Telang .................... H04L 9/083 713/193 |
| 8,520,855 | B1 * | 8/2013 | Kohno ................. G06F 21/602 380/277 |
| 8,522,011 | B2 | 8/2013 | Spalka et al. |
| 8,855,318 | B1 * | 10/2014 | Patnala .................... H04L 9/14 380/279 |
| 9,209,980 | B2 | 12/2015 | Bowman et al. |
| 9,251,531 | B2 * | 2/2016 | Sarkissian .......... G06Q 30/0251 |
| 9,258,130 | B2 | 2/2016 | Hwang et al. |
| 9,298,806 | B1 | 3/2016 | Vessenes et al. |
| 9,350,549 | B2 | 5/2016 | Lumb |
| 9,673,975 | B1 * | 6/2017 | Machani ............... H04L 9/0863 |
| 10,050,779 | B2 | 8/2018 | Alness et al. |
| 10,068,228 | B1 | 9/2018 | Winklevoss et al. |
| 10,510,053 | B2 | 12/2019 | Armstrong |
| 10,516,527 | B1 * | 12/2019 | Machani ............... H04L 9/0894 |
| 10,659,223 | B2 * | 5/2020 | Wright ................... H04L 9/085 |
| 10,719,816 | B1 | 7/2020 | Kurani |
| 11,115,196 | B1 * | 9/2021 | Triandopoulos ........ H04L 9/085 |
| 2001/0050990 | A1 * | 12/2001 | Sudia .................... G06Q 20/02 380/278 |
| 2002/0112171 | A1 | 8/2002 | Ginter et al. |
| 2002/0198791 | A1 | 12/2002 | Perkowski |
| 2003/0026432 | A1 * | 2/2003 | Woodward ............. H04L 9/085 380/278 |
| 2003/0046202 | A1 | 3/2003 | Knapp |
| 2003/0048906 | A1 * | 3/2003 | Vora ....................... G06Q 20/02 380/277 |
| 2003/0081785 | A1 | 5/2003 | Boneh et al. |
| 2003/0188153 | A1 * | 10/2003 | Demoff ............... G06F 11/2069 713/153 |
| 2004/0030932 | A1 * | 2/2004 | Juels .................... H04W 12/126 713/151 |
| 2004/0049687 | A1 | 3/2004 | Orsini et al. |
| 2004/0078775 | A1 * | 4/2004 | Chow .................... H04L 9/3271 717/100 |
| 2004/0111484 | A1 | 6/2004 | Young et al. |
| 2004/0190181 | A1 * | 9/2004 | Hikosaka ......... G11B 20/00086 |
| 2004/0193890 | A1 | 9/2004 | Girault |
| 2004/0252831 | A1 | 12/2004 | Uehara |
| 2005/0071283 | A1 | 3/2005 | Randle et al. |
| 2005/0094806 | A1 | 5/2005 | Jao et al. |
| 2005/0138374 | A1 * | 6/2005 | Zheng ................... H04L 9/0894 713/166 |
| 2006/0023887 | A1 | 2/2006 | Agrawal et al. |
| 2006/0034494 | A1 * | 2/2006 | Holloran ................. H04L 9/32 382/116 |
| 2006/0153365 | A1 | 7/2006 | Beeson |
| 2006/0153368 | A1 | 7/2006 | Beeson |
| 2006/0156013 | A1 | 7/2006 | Beeson |
| 2006/0161485 | A1 | 7/2006 | Meldahl |
| 2006/0179319 | A1 | 8/2006 | Krawczyk |
| 2006/0242038 | A1 * | 10/2006 | Giudilli ............... H04L 12/1403 705/30 |
| 2006/0248114 | A1 | 11/2006 | Anderson et al. |
| 2007/0055880 | A1 | 3/2007 | Lauter et al. |
| 2007/0165843 | A1 | 7/2007 | Lauter et al. |
| 2007/0192842 | A1 | 8/2007 | Beaulieu et al. |
| 2007/0223706 | A1 * | 9/2007 | Gantman ................ H04L 9/085 380/286 |
| 2007/0265978 | A1 | 11/2007 | Kahn et al. |
| 2007/0269040 | A1 | 11/2007 | Yuval et al. |
| 2007/0276836 | A1 | 11/2007 | Chatterjee et al. |
| 2007/0288320 | A1 * | 12/2007 | Cooper .................. G06Q 20/12 705/348 |
| 2008/0048022 | A1 * | 2/2008 | Vawter ................. G06Q 20/425 235/380 |
| 2008/0082817 | A1 | 4/2008 | Takahashi et al. |
| 2008/0101596 | A1 * | 5/2008 | Cerruti ................. G06F 21/602 380/30 |
| 2008/0137857 | A1 * | 6/2008 | Bellare ................... H04L 9/321 380/255 |
| 2008/0144836 | A1 | 6/2008 | Sanders et al. |
| 2008/0195499 | A1 * | 8/2008 | Meredith ............... G06Q 20/40 705/37 |
| 2008/0263357 | A1 | 10/2008 | Boyen |
| 2008/0285759 | A1 * | 11/2008 | Shaw ................... G06F 21/6218 380/278 |
| 2008/0288773 | A1 | 11/2008 | Nguyen et al. |

(56) References Cited

U.S. PATENT DOCUMENTS

| | | |
|---|---|---|
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1* | 11/2009 | Rose ............... H04L 63/0435 713/159 |
| 2010/0005302 A1* | 1/2010 | Vishnu ............... H04L 9/085 713/171 |
| 2010/0023771 A1 | 1/2010 | Struik |
| 2010/0031369 A1* | 2/2010 | Grummt ............ H04L 63/0428 726/27 |
| 2010/0037055 A1* | 2/2010 | Fazio ............... H04L 9/3255 713/171 |
| 2010/0042839 A1* | 2/2010 | Ho ................... H04L 9/0841 713/169 |
| 2010/0054458 A1* | 3/2010 | Schneider ............ H04L 9/14 380/28 |
| 2010/0054480 A1* | 3/2010 | Schneider ........... H04L 9/085 380/283 |
| 2010/0131752 A1* | 5/2010 | Flegel ............... H04L 9/085 713/152 |
| 2010/0131755 A1* | 5/2010 | Zhu ............... H04L 63/0815 713/155 |
| 2010/0134848 A1 | 6/2010 | Lynggaard et al. |
| 2010/0146292 A1* | 6/2010 | Shi ................. H04L 9/3263 713/189 |
| 2010/0150341 A1* | 6/2010 | Dodgson ............ H04L 9/085 380/29 |
| 2010/0172501 A1 | 7/2010 | Tian et al. |
| 2010/0199095 A1 | 8/2010 | Ho |
| 2010/0217986 A1* | 8/2010 | Schneider ........... H04L 9/085 713/171 |
| 2010/0228973 A1 | 9/2010 | Dancer et al. |
| 2010/0241848 A1* | 9/2010 | Smith ............... H04L 9/0891 713/153 |
| 2010/0268778 A1* | 10/2010 | Kim ............... H04L 67/51 709/204 |
| 2011/0016510 A1* | 1/2011 | Matsuda ............. H04L 9/0894 726/1 |
| 2011/0022854 A1 | 1/2011 | Macchetti et al. |
| 2011/0202773 A1 | 8/2011 | Ghouti et al. |
| 2011/0208790 A1 | 8/2011 | Brown et al. |
| 2011/0246766 A1* | 10/2011 | Orsini ............... G06F 21/6218 713/160 |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0198228 A1* | 8/2012 | Oberheide ........... H04L 63/126 713/155 |
| 2012/0214441 A1 | 8/2012 | Raleigh |
| 2012/0233674 A1* | 9/2012 | Gladstone ........... H04L 9/085 726/6 |
| 2012/0243687 A1* | 9/2012 | Li ................. H04L 9/085 380/277 |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1* | 1/2013 | Meredith ............ G06Q 30/06 705/26.1 |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1* | 4/2013 | Cannon ............ G06F 21/6209 713/168 |
| 2013/0159413 A1* | 6/2013 | Davis ............... G06Q 50/01 709/204 |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1* | 11/2013 | Campos ............ G06Q 20/36 705/41 |
| 2013/0305057 A1* | 11/2013 | Greco ............... G06F 21/62 713/189 |
| 2013/0305333 A1* | 11/2013 | Katzer ............... H04W 12/08 726/3 |
| 2013/0318578 A1* | 11/2013 | Palagummi ......... G06F 21/554 726/6 |
| 2013/0318588 A1* | 11/2013 | Metzger ............ G06F 21/313 726/7 |
| 2014/0012751 A1* | 1/2014 | Kuhn ............... G06Q 20/32 705/41 |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1* | 5/2014 | Blanco .............. G06Q 20/401 705/44 |
| 2014/0129844 A1 | 5/2014 | Johnson et al. |
| 2014/0188719 A1* | 7/2014 | Poornachandran .... G06Q 20/36 705/41 |
| 2014/0195425 A1* | 7/2014 | Campos ............ G06Q 20/3674 705/41 |
| 2014/0223580 A1 | 8/2014 | Neivanov et al. |
| 2014/0250006 A1* | 9/2014 | Makhotin ........... G06Q 20/326 705/41 |
| 2014/0270401 A1* | 9/2014 | Irwin ............... G06Q 20/4014 382/115 |
| 2014/0330923 A1* | 11/2014 | Baptist ............. G06F 11/1474 709/213 |
| 2015/0006386 A1* | 1/2015 | Tebbe ............... G06Q 20/3274 705/44 |
| 2015/0039470 A1 | 2/2015 | Crites |
| 2015/0052369 A1* | 2/2015 | Koning ............... H04L 9/085 713/193 |
| 2015/0066748 A1 | 3/2015 | Winslow et al. |
| 2015/0086020 A1 | 3/2015 | Harjula et al. |
| 2015/0089616 A1* | 3/2015 | Brezinski ............ G06F 21/31 726/7 |
| 2015/0095648 A1 | 4/2015 | Nix |
| 2015/0120567 A1 | 4/2015 | Van Rooyen et al. |
| 2015/0154562 A1* | 6/2015 | Emmerson ......... G06Q 20/1235 705/59 |
| 2015/0188698 A1* | 7/2015 | Tsai ............... H04L 63/0807 713/171 |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1* | 9/2015 | Ryhorchuk ......... H04L 63/0442 713/156 |
| 2015/0254639 A1* | 9/2015 | Radu ............... G06Q 20/36 705/41 |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1* | 10/2015 | Vaidyanathan .... G06Q 20/3672 705/42 |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1* | 12/2015 | Lindell ............. H04L 9/3228 713/168 |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |

(56) References Cited

U.S. PATENT DOCUMENTS

| | | |
|---|---|---|
| 2015/0379510 A1 | 12/2015 | Smith |
| 2015/0381729 A1* | 12/2015 | Manohar ............ H04W 12/033 709/203 |
| 2016/0027229 A1 | 1/2016 | Spanos et al. |
| 2016/0028552 A1 | 1/2016 | Spanos et al. |
| 2016/0055511 A1* | 2/2016 | Chidella ............ G06Q 30/0215 705/14.16 |
| 2016/0055583 A1* | 2/2016 | Liberty ............ G06Q 20/405 705/37 |
| 2016/0065370 A1* | 3/2016 | Le Saint ............ H04L 9/14 713/155 |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1* | 3/2016 | Salama ............ G06Q 20/3226 705/44 |
| 2016/0092988 A1 | 3/2016 | Letourneau |
| 2016/0098723 A1 | 4/2016 | Feeney |
| 2016/0132684 A1* | 5/2016 | Barbas ............ G06F 11/1448 713/165 |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0210617 A1* | 7/2016 | Leger ............ G06Q 20/367 |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1* | 9/2016 | Brickell ............ G06Q 20/3674 |
| 2016/0283941 A1 | 9/2016 | Andrade |
| 2016/0292672 A1 | 10/2016 | Fay et al. |
| 2016/0294562 A1* | 10/2016 | Oberheide ............ H04L 9/0863 |
| 2016/0321434 A1 | 11/2016 | McCoy et al. |
| 2016/0335924 A1 | 11/2016 | Ikarashi et al. |
| 2016/0337119 A1* | 11/2016 | Hosaka ............ H04L 9/3236 |
| 2016/0337124 A1* | 11/2016 | Rozman ............ H04L 9/085 |
| 2016/0342977 A1 | 11/2016 | Lam |
| 2016/0342994 A1 | 11/2016 | Davis |
| 2016/0344543 A1* | 11/2016 | Alness ............ G06Q 20/065 |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1* | 12/2016 | Bhandari ............ H04L 63/0435 713/171 |
| 2017/0005804 A1 | 1/2017 | Zinder |
| 2017/0011394 A1 | 1/2017 | Kumar et al. |
| 2017/0012948 A1* | 1/2017 | Peeters ............ H04L 9/085 |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1* | 2/2017 | Rowley ............ G06V 30/268 |
| 2017/0046698 A1 | 2/2017 | Haldenby et al. |
| 2017/0046792 A1* | 2/2017 | Haldenby ............ G06Q 50/08 |
| 2017/0061138 A1* | 3/2017 | Lambert ............ H04L 63/18 |
| 2017/0075877 A1 | 3/2017 | Lepeltier |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1* | 3/2017 | Lloyd ............ G06Q 20/4015 |
| 2017/0103385 A1 | 4/2017 | Wilson, Jr. et al. |
| 2017/0109540 A1* | 4/2017 | Heiman ............ G06F 21/33 |
| 2017/0124348 A1* | 5/2017 | Pourzandi ............ H04L 9/008 |
| 2017/0132621 A1 | 5/2017 | Miller et al. |
| 2017/0148016 A1 | 5/2017 | Davis |
| 2017/0154331 A1 | 6/2017 | Voorhees |
| 2017/0169403 A1* | 6/2017 | Zhang ............ G06Q 20/065 |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1* | 8/2017 | Smith ............ H04L 63/0428 |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1* | 11/2017 | Frincu ............ H04L 63/08 |
| 2018/0025670 A1* | 1/2018 | Ikarashi ............ G06F 21/64 380/28 |
| 2018/0034810 A1* | 2/2018 | Pe'Er ............ H04L 9/0894 |
| 2018/0109377 A1 | 4/2018 | Fu |
| 2018/0123780 A1* | 5/2018 | Ikarashi ............ H04L 9/085 |
| 2018/0146367 A1 | 5/2018 | Altin et al. |
| 2018/0176017 A1 | 6/2018 | Rodriguez et al. |
| 2018/0176222 A1* | 6/2018 | Bhaskar ............ H04L 63/0815 |
| 2018/0225431 A1* | 8/2018 | Ikarashi ............ G06F 21/60 |
| 2018/0240107 A1 | 8/2018 | Andrade |
| 2018/0247191 A1 | 8/2018 | Katz et al. |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1* | 1/2019 | Le Saint ............ H04L 63/0471 |
| 2019/0034936 A1 | 1/2019 | Nolan et al. |
| 2019/0080321 A1* | 3/2019 | Mundis ............ G06Q 20/0855 |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0285935 A1 | 9/2020 | Song et al. |
| 2021/0056070 A1 | 2/2021 | Kakavand et al. |
| 2021/0194677 A1* | 6/2021 | Pourzandi ............ H04L 9/0872 |
| 2021/0409489 A1 | 12/2021 | Speasl et al. |

FOREIGN PATENT DOCUMENTS

| | | |
|---|---|---|
| CN | 1262007 A | 8/2000 |
| CN | 101447980 A | 6/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104620535 A | 5/2015 |
| CN | 104704504 A | 6/2015 |
| CN | 105204802 A | 12/2015 |
| CN | 105306194 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |

(56) References Cited

FOREIGN PATENT DOCUMENTS

| | | | |
|---|---|---|---|
| JP | 2008146601 A | 6/2008 |
| JP | 2009105824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012-515393 A | 7/2012 |
| JP | 2014068140 A | 4/2014 |
| JP | 2015536617 A | 12/2015 |
| JP | 5858506 B1 | 2/2016 |
| JP | 2019512909 A | 5/2019 |
| KR | 20110012085 A | 2/2011 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016161073 A1 | 10/2016 |
| WO | 2017006134 A1 | 1/2017 |
| WO | 2017112664 A1 | 6/2017 |

OTHER PUBLICATIONS

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Antonopoulos, "Mastering Bitcoin—Unlocking Digital Cryptocurrencies," O'Reilly Media, Inc., Dec. 20, 2014, 282 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak! et al, "Understanding Stealth Addresses/Payments," Bitcoin Forum, Jun. 10, 2015 (retrieved Jun. 16, 2020), https://bitcointalk.org/index.php?topic=1086498.0, 8 pages.
BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_Return explained," Coinprism Blog, http://blog.coinprism.eom/2015/02/11/80-bytes-op-return/, Feb. 11, 2015 [retrieved Dec. 21, 2018], 8 pages.
Corallo, "[Bitcoin-development] Relative CheckLockTimeVerify (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
DRCode, "New Kid on the Blockchain," Hacker News, https://news.ycombinator.com/item?id=11372455, Mar. 28, 2016 [Dec. 12, 2018], 32 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2l91/time_to_lobby_bitcoins_core_devs_sf_bitcoin_devs/, Mar. 14, 2015 [Dec. 12, 2018], 21 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
FIMKrypto, "Fimk 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.

(56) References Cited

OTHER PUBLICATIONS

Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.

Gennaro et al., "Threshold-Optimal DSA/ECDSA Signatures and an Application to Bitcoin Wallet Security," International Conference on Applied Cryptography and Network Security, Jun. 9, 2016, 42 pages.

Gitbook, "Ethereum Frontier Guide," Gitbook (Legacy), Feb. 4, 2016, 293 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Goldfeder et al., "Securing Bitcoin wallets via threshold signatures" Princeton's Center for Information Technology Policy, Mar. 28, 2014, 11 pages.

Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.

Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.

Hao, "On Robust Key Agreement Based on Public Key Authentication," International Conference on Financial Cryptography and Data Security, Jan. 25, 2010, 12 pages.

Harayama et al., "Key escrow method of personal decryptographic key by using elliptic curve calculation," Institute of Electronics, Information and Communication Engineers (IEICE) Technical Report 109(85):91-96, Jun. 11, 2009.

Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.

International Search Report and Written Opinion dated Apr. 12, 2017, Patent Application No. PCT/IB2017/050829, 9 pages.

International Search Report and Written Opinion dated Apr. 26, 2017, International Patent Application No. PCT/IB2017/050865, filed Feb. 16, 2017, 9 pages.

International Search Report and Written Opinion dated Apr. 3, 2017, Patent Application No. PCT/IB2017/050824, filed Feb. 14, 2017, 13 pages.

International Search Report and Written Opinion dated Apr. 3, 2017, Patent Application No. PCT/IB2017/050827, 10 pages.

International Search Report and Written Opinion dated May 29, 2017, International Patent Application No. PCT/IB2017/050815, filed Feb. 14, 2017, 10 pages.

UK Commercial Search Report dated Nov. 30, 2016, Patent Application No. 1607058.3, filed Apr. 22, 2016, 7 pages.

UK Commercial Search Report dated Sep. 30, 2016, Patent Application No. 1606630.0, filed Apr. 15, 2016, 7 pages.

UK Expanded Commercial Search Report dated Jun. 15, 2016, Patent Application No. 1605026.2, 5 pages.

UK IPO Search Report dated Dec. 12, 2016, Patent Application No. GB1606630.0, filed Apr. 15, 2016, 4 pages.

UK IPO Search Report dated Dec. 21, 2016, Patent Application No. GB1607058.3, filed Apr. 22, 2016, 3 pages.

UK IPO Search Report dated Dec. 28, 2016, Patent Application No. GB1604497.6, filed Mar. 16, 2016, 4 pages.

UK IPO Search Report dated Jan. 25, 2017, Patent Application No. 1605026.2, 3 pages.

UK IPO Search Report dated Jul. 26, 2016, Patent Application No. GB1603114.8, filed Feb. 23, 2016, 5 pages.

UK IPO Search Report dated Jul. 4, 2016, Patent Application No. GB1603125.4, filed Feb. 23, 2016, 6 pages.

UK IPO Search Report dated Jul. 5, 2016, Patent Application No. GB1603123.9, filed Feb. 23, 2016, 5 pages.

UK IPO Search Report dated Oct. 17, 2016, Patent Application No. GB1603117.1, filed Feb. 23, 2016, 5 pages.

UK IPO Search Report dated Oct. 26, 2016, Patent Application No. GB1603122.1, filed Feb. 23, 2016, 4 pages.

UK IPO Search Report dated Sep. 9, 2016, Patent Application No. GB1605571.7, filed Apr. 1, 2016, 5 pages.

Vayngrib, "DHT hardening," GitHub, https://github.com/tradle/about/wiki/DHT-hardening, Feb. 2, 2015 (last updated May 21, 2015) [retrieved Dec. 13, 2018], 5 pages.

Vayngrib, "Future, operating business on chain," Github.com, May 4, 2015 [retrieved Jan. 30, 2017], https://github.com/tradle/about/wiki/Future,-operating-business-on-chain, 9 pages.

Vietnamese Office Action dated Sep. 27, 2018, Patent Application No. 1-2018-03358, filed Feb. 16, 2017, 2 pages.

Walport et al., "Distributed Ledger Technology: beyond block chain—A report by the UK Government Chief Scientific Adviser," United Kingdom Government Office for Science, Dec. 2015, 88 pages.

Watanabe et al., "Blockchain contract: A complete consensus using blockchain," IEEE 4th Global Conference on Consumer Electronics, Oct. 27, 2015, 3 pages.

Weller et al., "CounterpartyXCP/Documentation: Protocol Specification," Github.com, Jan. 25, 2015 (last edited Jun. 17, 2019) [retrieved Jan. 13, 2020], 10 pages.

Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.

Wikipedia, "Counterparty (platform)," last edited Dec. 6, 2019 [retrieved Jan. 13, 2020], 2 pages.

Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.

Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.

Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.

Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Wright, "Registry and Automated Management Method for Blockchain Enforced Smart Contracts," U.S. Appl. No. 15/138,717, filed Apr. 26, 2016.

Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.

Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.

Zyskind et al., "Decentralizing Privacy: Using a Blockchain to Protect Personal Data," 2015 IEEE CS Security and Privacy Workshops, May 21, 2015, 5 pages.

Zyskind et al., "Enigma: Decentralized Computation Platform with Guaranteed Privacy," arXiv preprint arXiv:1506, Jun. 10, 2015, 14 pages.

International Search Report and Written Opinion dated May 31, 2017, Patent Application No. PCT/IB2017/050856, filed Feb. 16, 2017, 11 pages.

(56) References Cited

OTHER PUBLICATIONS

International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Jesionek et al., "BIP0032: Hierarchical Deterministic Wallets," GitHub, https://github.com/bitcoin/bips/blob/master/bip-0032.mediawiki, Jan. 2014, 9 pages.
II2012 et al., "MinAddress : Now remember your addresses easily," BitCoinTalk, Sep. 16, 2014 (retrieved Jun. 16, 2020), https://bitcointalk org/index.php?topic=774741.150;wap2, 3 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Kosba et al., "Hawk: The Blockchain Model of Cryptography and Privacy—Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
MrBAndrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Openchain, "Home Page," openchain.org, Dec. 22, 2015 [retrieved May 8, 2020], https://web.archive.org/web/20151222083734/https://www.openchain.org/, 18 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign -bitcoin-wallet-identityspecification.pdf, Feb. 27, 2015 (retrieved Jan. 27, 2016), 24 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swanson, "Great Chain of Nos. Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action dated Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
TimeIsNow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Jun. 27, 2016, Patent Application No. GB 1603123.9, filed Feb. 23, 2016, 11 pages.
UK Commercial Search Report dated Jun. 27, 2016, Patent Application No. GB 1603125.4, filed Feb. 23, 2016, 11 pages.
UK Commercial Search Report dated Jun. 28, 2016, Patent Application No. GB 1603122.1, filed Feb. 23, 2016, 12 pages.
UK Commercial Search Report dated Jun. 6, 2016, Patent Application No. 1604497.6, filed Mar. 16, 2016, 6 pages.
UK Commercial Search Report dated Jun. 9, 2016, Patent Application No. GB1603117.1, filed Feb. 23, 2016, 12 pages.
UK Commercial Search Report dated May 20, 2016, Patent Application No. 1605026.2, 4 pages.

(56) References Cited

OTHER PUBLICATIONS

UK Commercial Search Report dated May 24, 2016, Patent Application No. GB1605571.7, filed Apr. 1, 2016, 3 pages.
UK Commercial Search Report dated May 9, 2016, Patent Application No. GB1603114.8, filed Feb. 23, 2016, 2 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_Return data TxOut as standard transaction type. #2738," Github, Jun. 4, 2013, https://github.com/bitcoin/bitcoin/pull/2738, 12 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
International Search Report and Written Opinion dated Apr. 12, 2017, Patent Application No. PCT/IB2017/050866, 10 pages.
International Search Report and Written Opinion dated Mar. 30, 2017, Patent Application No. PCT/IB2017/050825, 9 pages.
International Search Report and Written Opinion dated May 31, 2017, Patent Application No. PCT/IB2017/050980, 12 pages.
Menezes et al., "Handbook of Applied Cryptography: pp. 33, 38," CRC Press, Oct. 16, 1996, 3 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Taiwanese Office Action dated Jul. 28, 2020, Patent Application No. 106105709, 9 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 3, 2017, Patent Application No. 1604498.4, 4 pages.
Akutsu et al., "Taking on the challenge of creating epoch-making services that impress users. For services that can share the excitement of competitions around the world," NTT Technical Journal 27(5):10-14, May 1, 2015.
bitcoininvestor.com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.
Block_Chan, "Tweet dated Nov. 7, 2018," Twitter, Nov. 7, 2018, https://twitter.com/block_chan/status/1060336404163584000, 1 page.
Bradbury, "Developers Battle Over Bitcoin Block Chain," Coindesk, http://www.coindesk.com/developers-battle-bitcoin-block-chain/, Mar. 25, 2014, 3 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Fuchita, "Special Topic: Innovation and Finance, Blockchain and Financial Transaction Innovation," Nomura Capital Market Quarterly 19-2(74):11-35, Nov. 1, 2015.
Hearn, "Distributed markets," Bitcoin Wiki, https://en.bitcoin.it/wiki/Distributed_markets, Jul. 11, 2015 [retrieved Sep. 20, 2016], 5 pages.
International Search Report and Written Opinion dated Apr. 10, 2017, Patent Application No. PCT/IB2017/050861, 11 pages.

International Search Report and Written Opinion dated Mar. 29, 2017, Patent Application No. PCT/IB2017/050821, 10 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Oct. 8, 2019, Patent Application No. 2018-539895, 9 pages.
Kens et al., "Cryptocontracts Will Turn Contract Law Into a Programming Language," Hacker News, Feb. 23, 2014, https://news.ycombinator.com/item?id=7287155, 12 pages.
Minsky et al., "Computation: Finite and Infinite Machines Chapter 14: Very Simple Bases for Computability," Prentice Hall, Inc, 1967, 29 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat, "Handbook of Digital Currency Chapter 22: Blockchain Electronic Vote," Elsevier Inc., David Lee Kuo Chuen (ed.), May 2015, 9 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Taiwanese Office Action dated Apr. 12, 2021, Patent Application No. 109142412, 5 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
UK Commercial Search Report dated Nov. 14, 2016, Patent Application No. GB1607063.3, 8 pages.
UK IPO Search Report dated Dec. 15, 2016, Patent Application No. GB1607063.3, 6 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
International Search Report and Written Opinion dated Mar. 30, 2017, Patent Application No. PCT/IB2017/050819, 13 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Swan, "Blockchain: Blueprint for a New Economy," O'Reilly, Feb. 2015, 149 pages.
UK Commercial Search Report dated Jun. 27, 2016, Patent Application No. GB 1603125.4, 11 pages.
UK Commercial Search Report dated May 16, 2016, Patent Application No. GB1603125.4, 8 pages.
UK IPO Search Report dated Jul. 4, 2016, Patent Application No. GB1603125.4, 6 pages.
White, "How Computers Work," Que Publishing 7th Edition, Oct. 15, 2003, 44 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

(56) References Cited

OTHER PUBLICATIONS

Fujimura et al., "Bright: A Concept for a Decentralized Rights Management System Based on Blockchain," 2015 IEEE 5th International Conference on Consumer Electronics—Berlin (ICCE—Berlin), Sep. 6, 2015, 2 pages.

Fotiou et al., "Decentralized Name-based Security for Content Distribution using Blockchains," retrieved from, Mobile Multimedia Laboratory, Department of Informatics, Apr. 14, 2016, 6 pages.

Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.

Michalko et al., "Decent Whitepaper," retrieved from http://forklog.net/decent-finalizes-its-decentralized-content-distribution-platform/, Nov. 2015, 20 pages.

UK Commercial Search Report dated Oct. 10, 2016, Patent Application No. GB1607484.1, filed Apr. 29, 2016, 5 pages.

Michalko, "Decent Finalizes its Decentralized Content Distribution Platform," retrieved from http://forklog.net/decent-finalizes-its-decentralized-content-distribution-platform/, Dec. 14, 2016, 2 pages.

Australian Office Action for Application No. 2017223158, dated Jun. 22, 2021, 7 pages.

Satoshi et al., "Connection Limits," Bitcoin Forum, Aug. 9, 2010, https://bitcointalk.org/index.php?topic=741.0;prev_next=prev, 2 pages.

UK IPO Search Report dated Oct. 21, 2016, Patent Application No. GB1603112.2, 4 pages.

International Search Report and Written Opinion dated Apr. 21, 2017, Patent Application No. PCT/IB2017/050820, 12 pages.

Rockwell, "BitCongress—Process for Blockchain Voting & Law," retrieved from http://generalbitcoin.com/BitCongress_Whitepaper.pdf, Feb. 12, 2016, 8 pages.

Noizat et al., "Blockchain Electronic Vote," retrieved from https://www.weusecoins.com/assets/pdf/library/blockchain-electronic-vote.pdf, Apr. 29, 2015, 9 pages.

UK Commercial Search Report dated May 9, 2016, Patent Application No. GB1603112.2, 6 pages.

Luu et al., "Demystifying Incentives in the Consensus Computer," ISBN, Oct. 2015, 14 pages.

Hacker News, "Cryptocontracts Will Turn Contract Law into a Programming Language," retrieved from https://news.ycombinator.com/item?id=7287155, Feb. 23, 2014, 12 pages.

Anonymous, "Bitcoin Stats," retrieved from http://bitcoinstats.com/irc/bitcoin-dev/logs/2015/03/27, Mar. 27, 2015, 11 pages.

International Search Report and Written Opinion dated Apr. 12, 2017, Patent Application No. PCT/IB2017/050818, 10 pages.

Countyparty, "The Counterparty Protocol," retrieved from https://github.com/jsimnz/Counterparty/blob/master/README.md, Jan. 8, 2014, 6 pages.

Github, "Bitcoin/Bips," retrieved from http://web.archive.org/web/20150307191218/https://github.com/bitcoin/bips/blob/master/bip-0016.mediawiki, Apr. 5, 2014, 4 pages.

Ethereum, "EIP-20: Token Standard," retrieved from https://eips.ethereum.org/EIPS/eip-20, Nov. 19, 2015, 5 pages.

Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.

Bitcoin Forum, "Counterparty—Pioneering Peer-to-Peer Finance", https://bitcointalk.org/index.php?topic=395761.0, Feb. 1, 2014, 7 pages.

Bluematt, "Contract, Bitcoin Wiki", Oct. 22, 2015, 12 pages.

Brown, "On Distributed Satabases and Distributed Ledgers", Thoughts on the Future of Finance, Nov. 8, 2016, https://gendal.me/page/3/, 44 pages.

Buterin, "Introducing Ethereum Script 2.0", Ethereum Foundation Blog, Feb. 3, 2014, 9 pages.

crpit.com, FYJC Mumbai 11th Online Admission 2021—Part—1, 2 Admission Form (mumbai.11thadmission.Org.in), https://crpit.com, Jul. 6, 2021 8 pages.

DRWasho, "Openbazaar Documentation", Github, Jun. 2015, 53 pages.

Franco, "Understanding Bitcoin: Cryptography, Engineering and Economics," Wiley, ISBN: 978-1-119-01916-9, Oct. 2014, 144 pages.

github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.

Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.

International Search Report and Written Opinion dated Apr. 3, 2017, Patent Application No. PCT/IB2017/050827, 13 pages.

International Search Report and Written Opinion dated Aug. 3, 2018, Patent Application No. PCT/IB2018/053289, 10 pages.

International Search Report and Written Opinion dated Mar. 29, 2017, Patent Application No. PCT/IB2017/050821, 13 pages.

NXT, "Voting," nxt.org, website archived on Feb. 18, 2016 [retrieved May 31, 2022], https://web.archive.org/web/20160218021746/https://nxt.org/what-is-nxt/voting/, 3 pages.

UK Commercial Search Report dated Jun. 12, 2017, Patent Application No. GB510912, 6 pages.

UK Commercial Search Report dated Jun. 9, 2016, Patent Application No. GB1603114.8, 4 pages.

UK IPO Search Report dated Dec. 21, 2016, Patent Application No. GB1607058.3, 3 pages.

UK IPO Search Report dated Dec. 21, 2016, Patent Application No. GB1607484.1, 4 pages.

UK IPO Search Report dated Dec. 23, 2016, Patent Application No. GB1604495.0, 5 pages.

UK IPO Search Report dated Oct. 9, 2017, Patent Application No. GB1707788.4, 6 pages.

Gutoski et al., "Hierarchical Deterministic Bitcoin Wallets That Tolerate Key Leakage", Lecture Notes in Computer Science book series (LNSC, vol. 8975), Jan. 1, 2015, 9 pages.

Mirzadeh et al., "CPFP: An Efficient Key Management Scheme for Large Scale Personal Networks", IEEE, 2008, 6 pages.

Menezes et al., "Handbook of Applied Cryptography," CRC Press, Oct. 16, 1996, 811 pages.

Deloitte, "Blockchain Technology A Game-changer in Accounting", Mar. 2016, 5 pages.

* cited by examiner

SECURE MULTIPARTY LOSS RESISTANT STORAGE AND TRANSFER OF CRYPTOGRAPHIC KEYS FOR BLOCKCHAIN BASED SYSTEMS IN CONJUNCTION WITH A WALLET MANAGEMENT SYSTEM This application is a divisional of U.S. application Ser. No. 16/111,022 filed Aug. 23, 2018, entitled "SECURE MULTIPARTY LOSS RESISTANT STORAGE AND TRANSFER OF CRYPTOGRAPHIC KEYS FOR BLOCKCHAIN BASED SYSTEMS IN CONJUNCTION WITH A WALLET MANAGEMENT SYSTEM," which is a continuation of PCT Application No. PCT/IB2017/050829, filed Feb. 14, 2017, entitled "SECURE MULTIPARTY LOSS RESISTANT STORAGE AND TRANSFER OF CRYPTOGRAPHIC KEYS FOR BLOCK CHAIN BASED SYSTEMS IN CONJUNCTION WITH A WALLET MANAGEMENT SYSTEM," which claims priority to United Kingdom Application No. 1603117.1, filed Feb. 23, 2016, entitled "DETERMINING A COMMON SECRET FOR TWO BLOCKCHAIN NODES FOR THE SECURE EXCHANGE OF INFORMATION," United Kingdom Application No. 1605026.2, filed Mar. 24, 2016, entitled "SECURE MULTIPARTY LOSS RESISTANT STORAGE AND TRANSFER OF CRYPTOGRAPHIC KEYS FOR BLOCKCHAIN BASED SYSTEMS IN CONJUNCTION WITH A WALLET MANAGEMENT SYSTEM," and United Kingdom Application No. 1619301.3, filed Nov. 15, 2016, entitled "DETERMINING A COMMON SECRET FOR TWO BLOCKCHAIN NODES FOR THE SECURE EXCHANGE OF INFORMATION." The previously noted applications are hereby incorporated by reference in their entirety.

This invention relates generally to computer and data security, and more particularly to secure handling of highly sensitive data items such as cryptographic keys. The invention provides an access control mechanism. The invention is particularly suited for, but not limited to, use with digital (software) wallets. This may include, for example, wallets used in relation to cryptocurrencies such as Bitcoin. The invention provides an advantageous access control mechanism.

Cryptography involves techniques for secure storage of sensitive data as well as its communication between two or more nodes in a network. A node may include a mobile communication device, a tablet computer, a laptop computer, desktop, other forms of computing devices and communication devices, a server device in a network, a client device in a network, one or more nodes in a distributed network, etc. The nodes may be associated with, for example, a natural person, a group of people such as employees of a company, a system such as a banking system, or a distributed, peer-to-peer ledger (i.e. blockchain).

Two or more nodes may be linked by a communications network that is unsecure and vulnerable to eavesdropping or interception by unauthorised third parties. Therefore, messages sent between nodes are often sent in encrypted form. Upon receipt, the intended recipient decrypts the messages with corresponding decryption key(s) or other decryption methods. Thus the security of such communication may be dependent on preventing the third party from determining the corresponding decryption key.

One known cryptographic method includes using symmetric-key algorithms. The keys are symmetric in the sense that the same symmetric-key is used for both encryption of a plain text message and decryption of the cipher text message. However, the symmetric-key must be transmitted to both nodes in a secure way to prevent unauthorised access to it. This may include, for example, physically delivering the symmetric-key to the (authorised) nodes so that the symmetric-key is never transmitted over an unsecure communications network. However, physical delivery in not always a practical option. Therefore, a problem in such cryptographic systems is the establishment of the symmetric-key (which may be based on a common secret) between the nodes across an unsecure electronic network such as the internet. Thus this step of providing a symmetrical key (the common secret) is a potentially catastrophic vulnerability. As the symmetric-key algorithms and protocols are simple and widely used, there is a need for two nodes to determine a common secret based symmetrical key securely across an unsecure network.

The use of asymmetric-keys, also known as public-key cryptography, alleviates this issue to some extent. While the private key is kept secret its corresponding public key may be made publicly available. Its interception on a network is not catastrophic. Existing protocols include the Diffie-Hellman Key Exchange and the Three Pass Protocol.

However, storage of the private key gives rise to significant security concerns. Consider, for example, a digital wallet such as a Bitcoin wallet. Digital wallets comprise software which enables a user to connect with other nodes so as to perform transactions with their electronic assets e.g. using bitcoin funds to purchase goods and services. Public-key cryptography is often used to protect the vital information which is needed for such connections and transactions. The private key is stored either by the wallet installed on the user's device ('client side') or by a wallet service provider ('server side'). However, if the private key is stored only at the client side, the private key can be lost through theft, loss or damage caused to the user's hardware e.g. computer, mobile phone etc. Similarly, if the user dies or becomes incapacitated, knowledge of or access to the private key can be lost and thus the funds associated with the wallet become inaccessible. While server-side storage of the private key can overcome these problems, the user must be prepared to trust the service provider to keep their private key secure. Security breaches at the server side are a real and significant risk.

Thus, it is desirable to provide a solution which enables the safe handling of a secret. This secret may be a cryptographic key and/or something which may provide access to the key. Such an improved solution has now been devised. In accordance with the present invention there is provided an improved solution as defined in the appended claims.

The invention may provide a computer-implemented method. It may enable the control of access to a resource. It may be called a verification or authentication method. It may be referred to as a cryptographic key management solution. The resource may be any type of physical or electronic resource. In one embodiment, the resource is a digital wallet or some other resource relating to a form of currency. It may be a Bitcoin wallet or other wallet for the management of cryptocurrency resources. The invention may provide a method of controlling access to a digital wallet (and corresponding system).

The invention may be used during the set-up, registration or creation of a digital wallet via an unsecure communication channel (such as the internet), to enable subsequent wallet-related operations such as transactions to be handled, communicated and/or created in a secure fashion.

One or more embodiments of the invention may comprise the step of deriving the cryptographic key from an existing cryptographic key pair. This may comprise the steps of:
- determining a first entity second private key based on at least a first entity master private key and a generator value;
- determining a second entity second private key based on at least a second entity master private key and the generator value;
- determining a common secret (CS) at the first entity based on the first entity second private key and the second entity second public key, and determining the common secret (CS) at the second entity based on the second entity second private key and first entity second public key; and wherein:
- the first entity second public key and the second entity second public key are respectively based on at least the first/second entity master key and the generator value.

Additionally or alternatively, the invention may comprise a method of controlling access to a digital wallet, the method comprising the steps:
- determining a first entity second private key based on at least a first entity master private key and a generator value;
- determining a second entity second private key based on at least a second entity master private key and the generator value;
- determining a common secret (CS) at the first entity based on the first entity second private key and the second entity second public key, and determining the common secret (CS) at the second entity based on the second entity second private key and first entity second public key; and wherein:
- the first entity second public key and the second entity second public key are respectively based on at least the first/second entity master key and the generator value.

Additionally or alternatively, the method may comprise the steps:
- splitting a verification element into a plurality of shares;
- determining a common secret at or on two or more nodes in a network;
- using the common secret to transmit at least one share of the verification element from one node in the network to at least one other node.

The verification element may be a cryptographic key. It may be a private key in an asymmetric cryptography pair. Additionally or alternatively, it may be a representation of a cryptographic key, or some item which may be used to access, calculate, derive or retrieve a cryptographic key. It may be some secret or value which can be used in a verification process such as, for example, a mnemonic or a seed.

Thus, one aspect of the invention may relate to splitting a secret such as a private key into (unique) shares. The verification element may be split into a plurality of shares such that the verification element can be restored or regenerated from two or more of the shares. Shamir's Secret Sharing Scheme may be used to split the verification element into shares.

The shares may be split such that any share on its own is of no value, meaning that it cannot be used to arrive at the (original, un-split) verification element. The split may be performed such that the verification element can only be restored upon combination of a predetermined number of shares. In one embodiment, any two shares may be sufficient for restoration of the verification element.

Another aspect of the invention may relate to safe handling or storage of the respective shares. The shares may be sent to, and stored by, different parties. Some or all of these parties may be nodes on the network. In one embodiment, the method may comprise the step of storing at least three shares of the verification element at different locations relative to each other.

At least one of the shares may be stored in or on a back-up or "safe-storage" facility. This may be separate, independent and/or distinct from any other location which stores a share. This provides an important advantage, because it enables restoration of the verification element in the event that one of the other shares becomes unavailable. In such a situation, the share may be retrieved from the safe-storage facility.

A verification process may be performed prior to restoration of the verification element using the shares. The verification process may comprise verification of the identity of a pre-determined or designated individual, and/or a computing resource.

Another aspect of the invention may relate to the secure distribution of one or more of the shares. The method may comprise the step of using the common secret to generate an encryption key, wherein the encryption key is used to encrypt at least one share of the verification element or a message comprising said at least one share.

The common secret may be determined at the at least two nodes independently of each other. Thus, each node may determine or generate the secret for themselves, without input from or communication with the other node or another party. This means that the common secret may not require transmission over a communications channel. This provides enhanced security because it cannot be intercepted by unauthorised parties. The common secret may be common to (i.e. shared by) only the at least two nodes. The common secret may then be used to generate an encryption key, and that encryption key may be used for the safe transmission of the share(s). Other data may also be transmitted using the encryption key.

The method may comprise the step of determining, at a first node (C), a common secret (CS) that is common with the first node (C) and a second node (S), wherein the first node (C) is associated with a first asymmetric cryptography pair having a first node master private key ($V_{1C}$) and a first node master public key ($P_{1C}$), and the second node (S) is associated with a second asymmetric cryptography pair having a second node master private key (V is) and a second node master public key ($P_{1S}$), wherein the method comprises:
- determining a first node second private key ($V_{2C}$) based on at least the first node master private key ($V_{1C}$) and a Generator Value (GV);
- determining a second node second public key ($P_{2S}$) based on at least the second node master public key ($P_{1S}$) and the Generator Value (GV); and
- determining the common secret (CS) based on the first node second private key ($V_{2C}$) and the second node second public key ($P_{2S}$),
- wherein the second node (S) has the same common secret (S) based on a first node second public key ($P_{2C}$) and a second node second private key ($V_{2S}$), wherein: the first node second public key ($P_{2C}$) is based on at least the first node master public key ($P_{1C}$) and the Generator Value (GV); and the second node second private key ($V_{2S}$) is based on at least the second node master private key ($V_{1S}$) and the Generator Value (GV).

The Generator Value (GV) may be based on a message (M). The method may further comprise: generating a first signed message (SM1) based on the message (M) and the first node second private key ($V_{2C}$); and sending, over the communications network, the first signed message (SM1) to the second node (S), wherein the first signed message (SM1) can be validated with a first node second public key ($P_{2C}$) to authenticate the first node (C).

The method may also comprise: receiving, over the communications network, a second signed message (SM2) from the second node (S); validating the second signed message (SM2) with the second node second public key (P2S); and authenticating the second node (S) based on the result of validating the second signed message (SM2), wherein the second signed message (SM2) was generated based on the message (M), or a second message (M2), and the second node second private key ($V_{2S}$).

The method may further comprise generating a message (M); and sending, over a communications network, the message (M) to the second node (S). Alternatively, the method may comprise receiving the message (M), over the communications network, from the second node (S). In yet another alternative, the method may comprise receiving the message (M), over the communications network, from another node. In yet another alternative, the method may comprise receiving the message (M) from a data store, and/or an input interface associated with the first node (C).

The first node master public key ($P_{1C}$), second node master public key ($P_{1S}$) may be based on elliptic curve point multiplication of respective first node master private key ($V_{1C}$) and second node master private key ($V_{1S}$) and a generator (G).

The method may further comprise the steps of: receiving, over the communications network, the second node master public key ($P_{1S}$); and storing, at a data store associated with the first node (C), the second node master public key ($P_{1S}$).

The method may further comprise the steps of: generating, at a first node (C), the first node master private key ($V_{1C}$) and the first node master public key ($P_{1C}$); sending, over the communications network, the first node master public key ($P_{1C}$) to the second node (S) and/or other node; and storing, in a first data store associated with the first node (C), the first node master private key ($V_{1C}$).

The method may also comprise: sending, over the communications network, to the second node, a notice indicative of using a common elliptic curve cryptography (ECC) system with a base point (G) for the method of determining a common secret (CS). The step of generating the first node master private key ($V_{1C}$) and the first node master public key ($P_{1C}$) may comprise: generating the first node master private key ($V_{1C}$) based on a random integer in an allowable range specified in the common ECC system; and determining the first node master public key ($P_{1C}$) based on elliptic curve point multiplication of the first node master private key ($V_{1C}$) and the base point (G) according to the following formula:

$$P_{1C}=V_{1C} \times G$$

The method may further comprise: determining the Generator Value (GV) based on determining a hash of the message (M), wherein the step of determining a first node second private key ($V_{2C}$) is based on a scalar addition of the first node master private key ($V_{1C}$) and the Generator Value (GV) according to the following formula:

$$V_{2C}=V_{1C}+GV$$

The step of determining a second node second public key (P2S) may be based on the second node master public key ($P_{1S}$) with elliptic curve point addition to the elliptic curve point multiplication of the Generator Value (GV) and the base point (G) according to the following formula:

$$P_{2S}=P_{1S}+GV \times G.$$

The Generator Value (GV) may be based on determining a hash of a previous Generator Value (GV).

The first asymmetric cryptography pair and the second asymmetric cryptography pair may be based on a function of respective previous first asymmetric cryptography pair and previous second asymmetric cryptography pair.

In an alternative wording, the invention may provide a method comprising the steps: splitting a verification element into a plurality of shares;

generating, at a first node, a derived (or second) private cryptographic key based on a first master asymmetric key pair;

using the derived private key for the encryption and/or secure transmission of least one share of the verification element.

The method may also comprise the step of generating, at a second node, the same derived private key, this being generated independently of the first node and based on a second master asymmetric key pair.

The derived private key may be part of an asymmetric key pair comprising the private key and a public key. The first and/or second nodes may use Elliptic Curve Cryptography (ECC) to generate the private key (and its corresponding public key).

The method may comprise the steps:

Agreeing on, between the first and second nodes, a standard ECC system using a base point (G); and/or generating, at the first and/or second node, a public/private key pair using the agreed standard ECC system and publishing the public key; this may mean making it publicly available; and/or registering the first node's master public key ($P_{MC}$) at the second node or another location; and/or registering the second node's master public key ($P_{MC}$) at the first node or another location; and/or sending a message (M) from the first node to the second node and/or vice versa, and creating a hash of the message; the message may be signed using the derived private key; this step may represent the only transmission required to 1) establish a shared secret between the nodes and 2) initiate a secured communication session between them. The first or second node may use the received message M to generate its own derived (secondary) public/private key pair. This may allow the node to calculate the other node's derived public key; and/or receiving the message and independently calculating the hash of the message M (e.g. SHA-256(M)); and/or calculating a public key ($P_{2C}$) which is derivable from the master key ($P_{MC}$); and/or validating the signature (Sig-$V_{2C}$) against the calculated $P_{2C}$ The derived private key may be deterministically derived from the first or second node's master public key.

The invention may also comprise a computer-implemented system arranged and configured to implement any embodiment of the method(s) described above. The system may comprise or utilise a blockchain network or platform. Additionally or alternatively, it may comprise a digital wallet provider or management system.

Any feature described above in relation to one aspect or embodiment of the invention may also be used in relation to any other aspect or embodiment. For example, and feature described in relation to the method may apply to the system and vice versa.

These and other aspects of the present invention will be apparent from and elucidated with reference to, the embodiment described herein.

An embodiment of the present invention will now be described, by way of example only, and with reference to the accompany drawings, in which.

Figure 1:
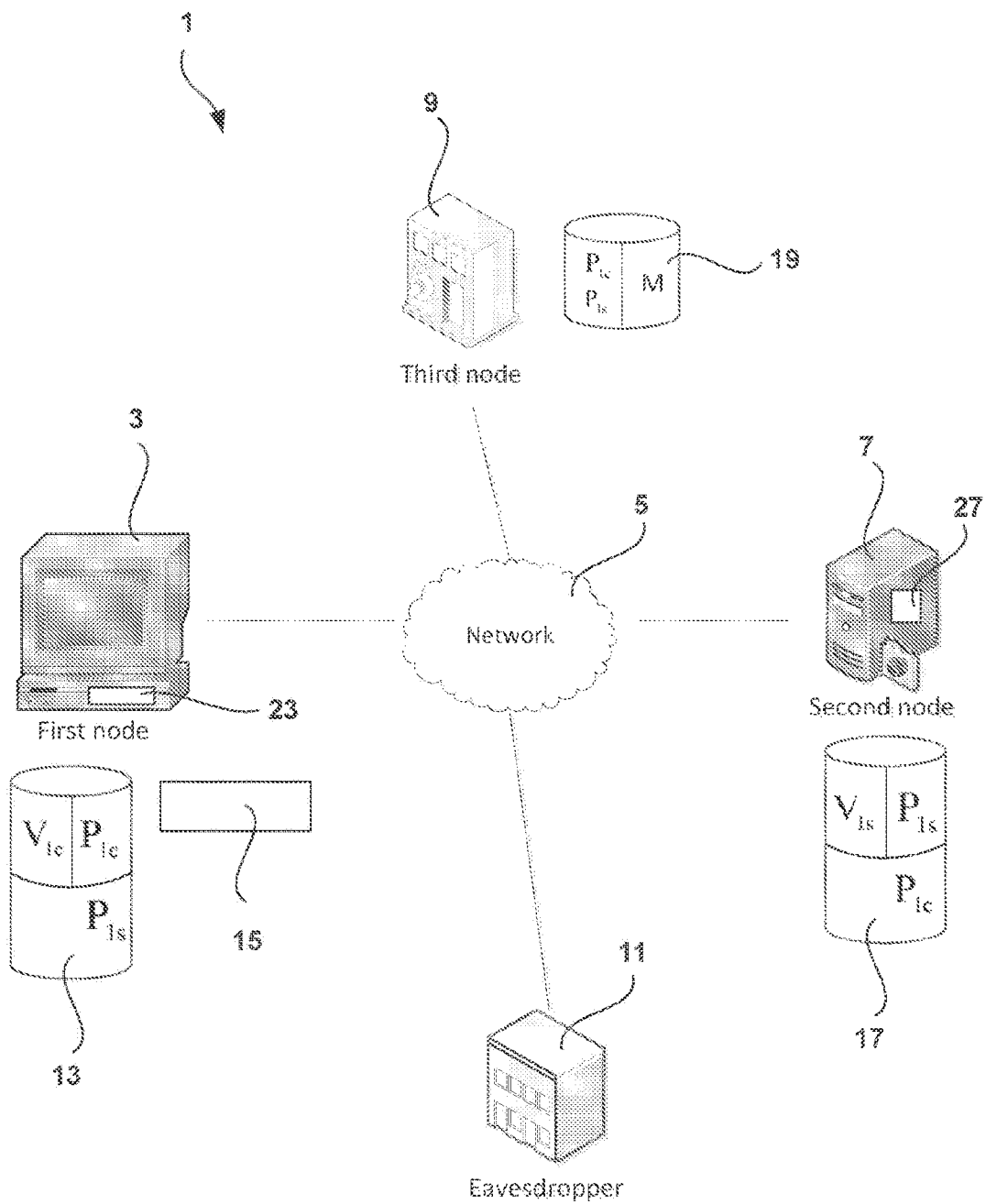
FIG. 1 is a schematic diagram of an example system to determine a common secret for a first node and second node, as may be used in accordance with the present invention for secure transmission of highly sensitive information, such as a share of a private key.
Figure 2:
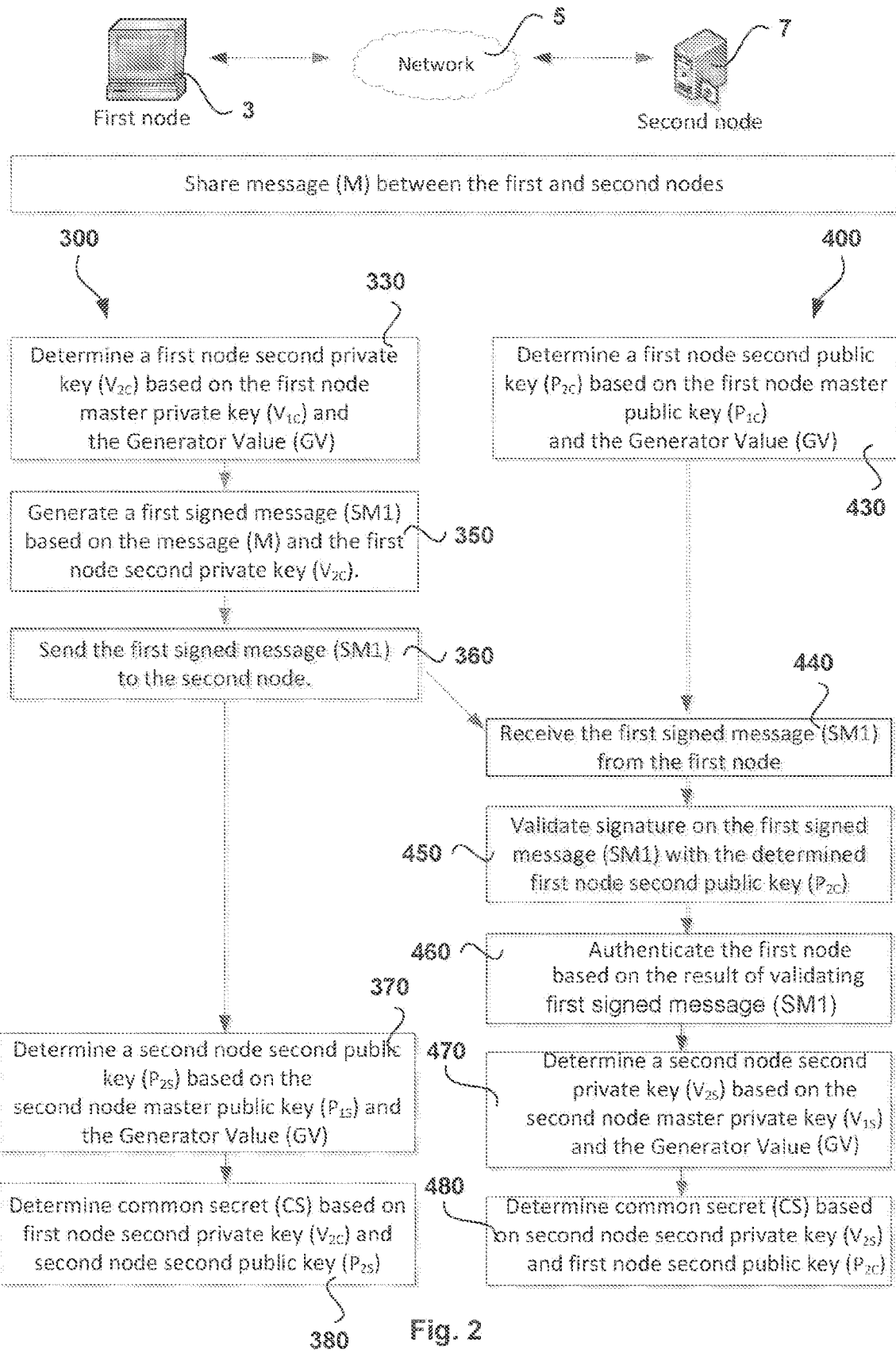
FIG. 2 is a flow chart of computer-implemented methods for determining a common secret as may be used in accordance with the present invention for secure transmission of highly sensitive information, such as a share of a private key.

As explained above, a need exists for enhanced storage and/or exchange of a secret such as a cryptographic key, or a secret which can be used to generate a key. The secret may be a seed for a wallet mnemonic, or other security-related item. The invention provides such a solution. An embodiment is described below for the purposes of illustration, and uses the context of a digital wallet implemented on a blockchain. However, the invention is not limited to such implementations and could be implemented in respect of any computer-implemented network or system.

As above, public-key cryptography is often used in relation to digital wallets. If the end user (which we may refer to as a "client" or simply "user") is responsible for storing their private key, problems may arise when the user or their hardware become unavailable as this renders the private key, and thus the wallet's funds, inaccessible. However, storage of the key at the wallet provider's end (which we may refer to as "server side") requires a degree of trust in that provider and their security mechanisms. So there is a need to store the private key in such a way that it cannot be obtained by an unauthorised party, but can also be reproduced when necessary. The term "user" may be a human user or a computer-implemented resource.

One known cryptographic algorithm, known as "Shamir's secret sharing scheme" (4S), teaches splitting the secret up into unique parts or shares which are then distributed to different parties. The shares can be used to reconstruct the secret thereafter. Each individual share is of no value or use on its own until it is combined with one or more other shares. The number of shares required to reconstruct the secret can vary according to the needs of the situation. In some cases, all shares may be required, while in other cases only a sufficient number are required. This is known as the threshold scheme, where any k of the shares are sufficient to reconstruct the original secret.

In this illustrative embodiment, 4S is used to split a secret such as a private key or mnemonic seed into a number of parts. It is then also used to regenerate the key or mnemonic seed from a certain number of parts. The use of mnemonics is known in conjunction with digital wallets. The mnemonic is a human-friendly code or group of words which can be turned into a binary seed for the generation of a wallet or data.

Herein, there following terms may be used.

"Secret" (S) is a secret (e.g. a number or value) that needs to be shared securely between parties.

"Share" is a piece of the secret. The secret is divided into pieces and each piece is called a share. It is computed from the given secret. In order to recover the secret, one must obtain a certain numbers of shares.

"Threshold" (k) is the minimum number of shares that one needs to regenerate or recover the secret. The secret can be regenerated only when you have >=k shares.

"Prime" (p) is a random prime number.

From a broad perspective, an illustrative embodiment may comprise a method as follows. In this example, we use a '2-of-3' scheme (i.e. k=2):

A user registers with a wallet provider to generate and set up a new wallet associated with that user. In this example, the wallet is a Bitcoin wallet, which utilises the Blockchain A public-private key pair is generated and associated with the user's wallet;

The private key is split into shares, using 4S

One share of the private key is sent via a secure transmission to the user

Another share of the private key is retained by the service provider and stored on a server Another share is sent via a secure transmission to a remote location for safe storage. The term 'remote' does not imply any particular geographical distance or location. Instead, it is used herein to mean that the share is held in, at or on a secure storage facility or resource which is independent in some sense from the wallet provider or the user, preferably both. "Independent" may include physical, logical, financial, political and/or organisationally independent. For example, the safe storage may be contracted out to a commercial entity which provides the safe storage service for a fee; or it may be held by the user's attorney, or some other elected (and trusted) party who accepts responsibility for storing the share and supplying it upon request if needed;

The wallet provider can destroy any or all copies of the complete private key, because it is no longer needed. When the private key is needed for subsequent authorisation of the user (e.g. because the user now wishes to make a transaction) the key can be reconstructed from the user's share, which the user provides to the wallet provider as and when needed, and the wallet provider's share.

An advantage of this is that even if the wallet provider's security is breached, the unauthorised party cannot gain access to the user's private key because it is not stored anywhere on the wallet provider's system and the wallet provider's system alone does not contain enough shares to allow reconstruction of the private key. This same advantage applies in situations where the client's security is breached.

Another advantage is that by storing a share at a safe storage location, the private key can be reconstructed by retrieving that share from safe storage and combining it with the wallet provider's share. Thus, if the user dies or becomes incapacitated, or if the user's hardware (and thus share) is lost, damaged or stolen, the funds in the wallet can still be accessed. In such a situation, the user's identity would be verified. In some cases, the identity of a proven, trusted party such as executor of an estate or attorney would be verified. This may be achieved, by example, upon production of evidence such as death certificate, passport, a legal document or other form of identification. Upon verification of authorised identity, the share of the secret would be retrieved from safe storage. Therefore, the safe storage serves as a type of back-up facility which can be used in exceptional or pre-determined circumstances.

Thus, the invention provides an advantageous combination of enhanced system/data security plus convenience. It provides a simple, effective and secure solution for access control.

It should be noted that in the above example, the private key is generated by the wallet service provider and respective parts are sent to the user and safe storage resource. However, this may not be the case in other embodiments. It is also important to note that transmission of parts between parties, which may be referred to as 'nodes', must be performed in a secure manner because any unauthorised interception of multiple shares could enable the interceptor to reconstruct the secret (e.g. mnemonic or key). This secure exchange problem is also addressed by the invention, as described below.

More detailed aspects of the invention are now described for the purpose of illustration. It should be noted that Shamir's Secret Sharing Scheme is a technique which is known in the art, and the skilled person would be aware of, understand and be able to use it. Therefore, the following is provided for the purpose of completeness only.

Splitting the Secret into Shares

Given a secret S, a number of participants n, a threshold number k, and some prime number p, we construct a polynomial:

$$y=f(x) \text{ of degree } k-1 \text{ (modulo our prime } p\text{)}$$

with constant term S.

Next, we choose n unique random integers between 1 and p−1, inclusive, and evaluate the polynomial at those n points. Each of the n participants is given a (x, y) pair. This can be achieved by the following steps.

1. Convert into Integer

For the 4S algorithm, the secret needs to be an integer. Hence if the secret is in some other format (ex. String, hex etc.) it must be converted into an integer first. If the secret is already an integer, this step can be omitted. For this example, let S=1234.

2. Decide Number of Shares (n) and Threshold (k)

Note that k parts will be required to regenerate the secret. Hence, choose S and k such that k parts can always be obtained while recovering the secret. For this example, let n=6, k=3.

3. Create the Polynomial

We need to create a polynomial of the form: y=f(x) mod p i. Determine constant term and degree of polynomial $$f(x)=a_0+a_1x+a_2x^2+a_3x^3+\ldots+a_{k-1}x^{k-1}$$

The constant term $a_0=S$
degree of polynomial=k−1
Hence for k=3 and S=1234, we need to build a polynomial with degree 2 and $a_0=1234$ $$f(x)=1234+a_1x+a_2x^2$$

ii. Determine coefficients

Chose k−1 random numbers (use a Random (or pseudo random) Number Generator) such that:

$$0<a_n<S$$

Let $a_1=166$; $a_2=94$
Hence, $f(x)=1234+166x+94 x^2$ iii. Select a random prime number
Chose a random prime number (p) such that:

$$p>\max(S,n)$$

Let p=1613 iv. Final polynomial $$y=f(x) \bmod p$$

$$y=(1234+166x+94x^2) \bmod 1613$$

Creating the Shares

To divide the secret into n shares, we need to construct n points (shares) using the polynomial:

$$y=(1234+166x+94x^2) \bmod 1613$$

Since n=6 for this example, we will have 6 points. Note that we start with x=1 and NOT x=0.
For x=1 to 6, the 6 points are as follows:
(1, 1494); (2, 329); (3, 965); (4, 176); (5, 1188); (6, 775)

Out of these n (6) points, any k (3) points can be used to regenerate the secret key.

Reconstructing the Secret from a Given Number of Shares i. Get the secret integer
To reconstruct the secret, we need following information:

$$n=6, k=3, p=1613,$$

k shares:

$$(x0,y0)=(1,1494); (x1,y1)=(2,329); (x2,y2)=(3,965)$$

Once we have the above information, we can use a technique such as Lagrange Interpolation which is known in the art and readily appreciated by the skilled person. Using this technique we can rebuild the entire polynomial. The coefficients can be calculated according to formula below:

$$a_i(x)=[\Sigma^{k-1}_{i=0} y_i \Pi_{0 \leftarrow j \leftarrow k-1, j \neq i}(x-x_j)/(x_i-x_j)] \bmod p$$

but since $S=a_0$, we only need to find $a_0=a_0(0)$ $$a_0 = \left[\sum_{i=0}^{k-1} y_i \prod_{\substack{0 \leq j \leq k-1 \\ j \neq 1}} \frac{-x_j}{x_i - x_j}\right] \bmod p$$

where $x_i - x_j \neq 0$

The skilled person will understand that in the above, the exponent −1 signifies taking the multiplicative inverse. Most programming languages comprise inbuilt packages to perform mathematical operations such as multiplicative inverse.

ii. Convert integer to desired format
If Step 1 was performed to convert a specific format to an integer, we follow the reverse procedure to convert the integer back to the desired format.

Secure Transmission of the Shares

As mentioned above, it is important that the shares of the secret are transmitted to the respective recipients in a secure manner so as to prevent unauthorised parties from being able to reconstruct the secret. In a preferred embodiment, the secure transmission can be achieved as described below.

A common secret (CS) can be established between two parties and then used to generate a secure encryption key for transmission of one or more of the shares. This common secret (CS) is not to be confused with the secret (S) referred to above. The Common Secret (CS) is generated and used to enable secure exchange of the Secret (S) e.g. key or share thereof.

The two parties could be any two of the wallet service provider, the user, the safe storage resource or some other legitimate party. Hereafter, for the sake of convenience, they will be referred to as a first node (C) a second node (S). The aim is to generate a common (CS) secret which both nodes know but without that common secret having been sent via a communication channel, thus eliminating the possibility of its unauthorised discovery. The secret splitting plus safe storage technique, in combination with a secure transmission technique such as described below, provides a secure key-management solution.

The secure transmission technique of the present invention involves the CS being generated at each end of the transmission in an independent manner, so that while both nodes know the CS it has not had to travel over potentially unsecure communication channels. Once that CS has been established at both ends, it can be used to generate a secure encryption key that both nodes can use for communication thereafter. This is of particular benefit during the wallet registration process, for transmission of the split private key from one party to another.

FIG. 1 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine the common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key) for encrypted communication between the first and second nodes 3, 7 over the communications network 5.

The methods 300, 400 may include additional steps. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In yet another example, the message may be generated at a third node 9 and the message sent to both the first and second nodes 3, 7. In yet another alternative, a user may enter the message through a user interface 15 to be received by the first and second nodes 3, 7. In yet another example, the message (M) may be retrieved from a data store 19 and sent to the first and second nodes 3, 7. In some examples, the message (M) may be public and therefore may be transmitted over an unsecure network 5.

In further examples, one or more messages (M) may be stored in a data store 13, 17, 19, where the message may be associated with some entity such as digital wallet, or a communication session established between the first node 3 and the second node 7. Thus the messages (M) may be retrieved and used to recreate, at the respective first and second nodes 3, 7, the common secret (CS) associated with that wallet or session.

Advantageously, a record to allow recreation of the common secret (CS) may be kept without the record by itself having to be stored privately or transmitted securely. This may be advantageous if numerous transactions are performed at the first and second nodes 3, 7 and it would be impractical to store all the messages (M) at the nodes themselves.

Method of Registration 100, 200

Figure 3:
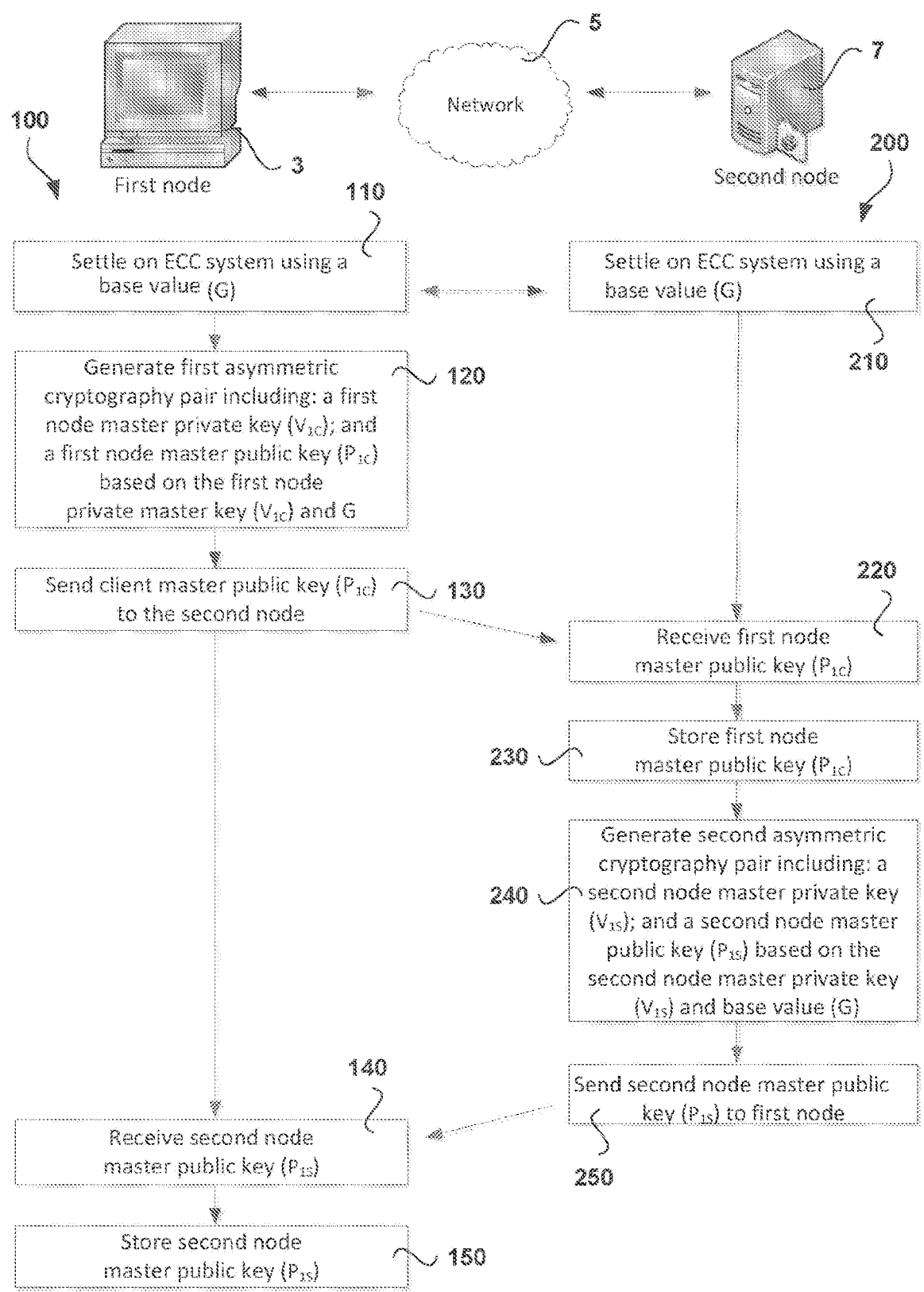
FIG. 3 is a flow chart of computer-implemented methods to register the first and second nodes.

An example of a method of registration 100, 200 will be described with reference to FIG. 3, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C}=V_{1C}\times G \quad \text{(Equation 1)}$$

Thus the first asymmetric cryptography pair includes:
$V_{1C}$: The first node master private key that is kept secret by the first node.
$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

The method 100 further includes sending 130 the first node master public key ($P_{1C}$), over the communications network 5, to the second node 7. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key (P is). The second node master private key ($V_{1S}$) is also a random integer within the allowable range. In turn, the second node master public key ($P_{1S}$) is determined by the following formula:

$$P_{1S}=V_{1S}\times G \quad \text{(Equation 2)}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup of, for example, the digital wallet.

Session Initiation and Determining the Common Secret by the First Node 3

Figure 4:
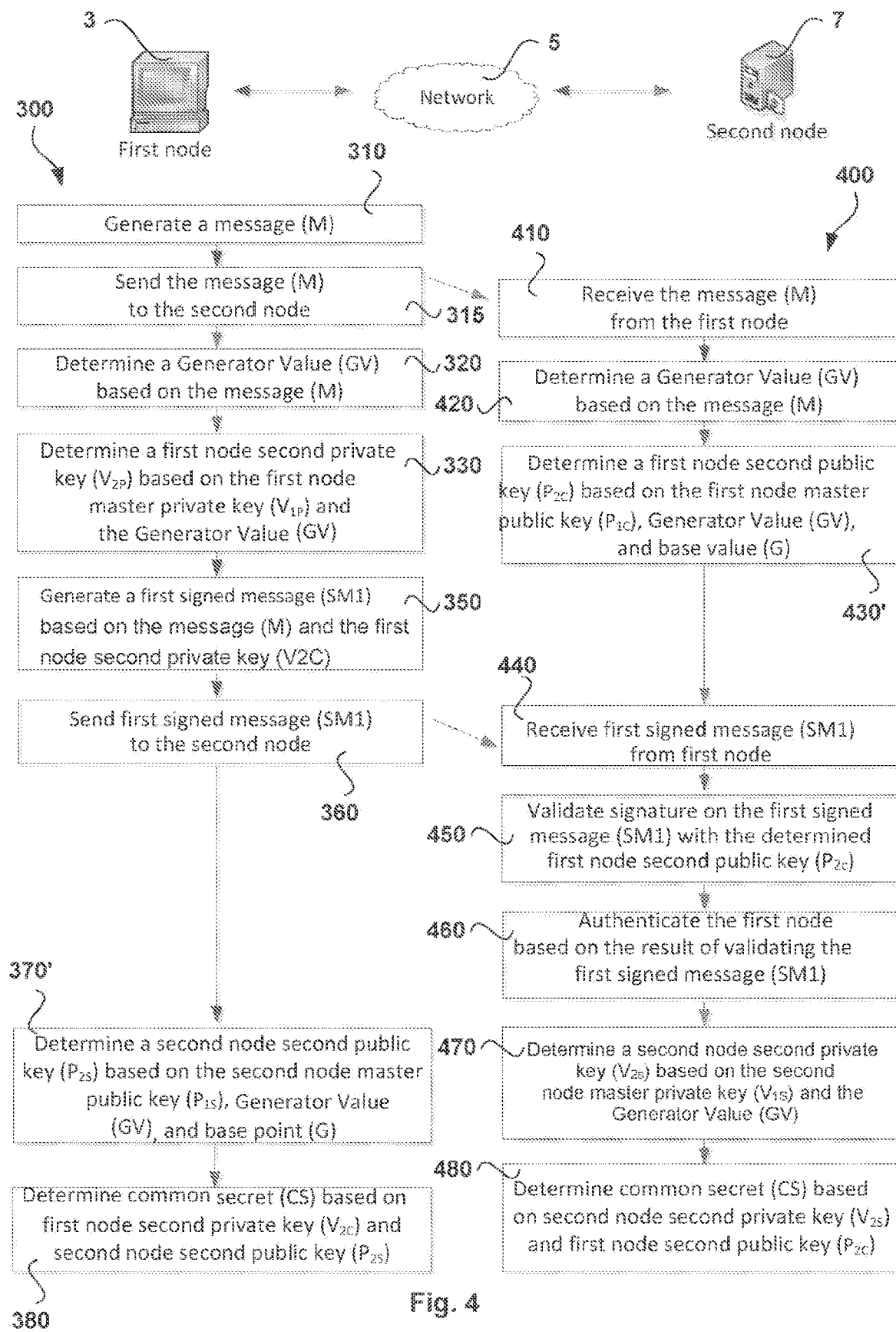
FIG. 4 is another flow chart of computer-implemented methods for determining a common secret as may be used in accordance with the present invention for secure transmission of highly sensitive information, such as a share of a private key.
Figure 5:
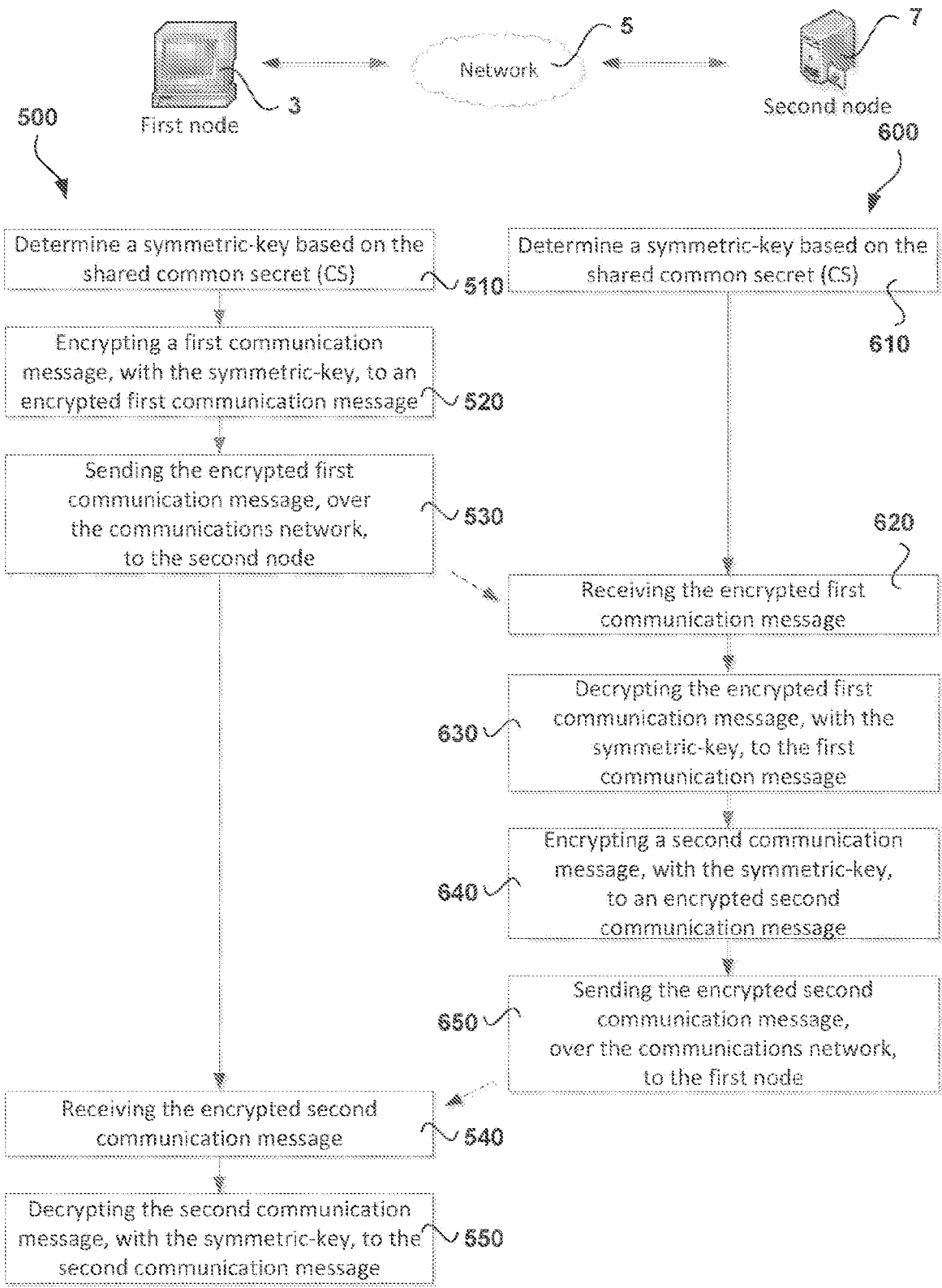
FIG. 5 is a flow chart of computer-implemented methods of secure communication between the first node and second node.

An example of determining a common secret (CS) will now be described with reference to FIG. 4. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message }(M)=\text{UnixTime}+\text{nonce} \quad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV=\text{SHA-256}(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C}=V_{1C}+GV \quad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C}=V_{2C}\times G \quad \text{(Equation 6)}$$

Substitution of $V_{2C}$ from Equation 5 into Equation 6 provides:

$$P_{2C}=(V_{1C}+GV)\times G \quad \text{(Equation 7)}$$

where the '+' operator refers to elliptic curve point addition. Noting that elliptic curve cryptography algebra is distributive, Equation 7 may be expressed as:

$$P_{2C}=V_{1C}\times G+GV\times G \quad \text{(Equation 8)}$$

Finally, Equation 1 may be substituted into Equation 7 to provide:

$$P_{2C}=P_{1C}+GV\times G \quad \text{(Equation 9.1)}$$

$$P_{2C}=P_{1C}+\text{SHA-256}(M)\times G \quad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1).

Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S}=V_{2S}\times G \quad \text{(Equation 10.1)}$$

$$P_{2S}=P_{1S}+GV\times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S=V_{2C}\times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C}=V_{2C}\times G \quad \text{(Equation 12.1)}$$

$$P_{2C}=P_{1C}+GV\times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The above authentication may be suitable for scenarios where one of the two nodes is a trusted node and only one of the nodes need to be authenticated. For example, the first node 3 may be a client and the second node 7 may be a server trusted by the client such as a wallet provider. Thus the server (second node 7) may need to authenticate the credentials of the client (first node 3) in order to allow the client access to the server system. It may not be necessary for the server to be authenticate the credentials of the server to the client. However in some scenarios, it may be desirable for both nodes to be authenticated to each other, such as in a peer-to-peer scenario.

The Second Node 7 Determining the Common Secret

The method 400 may further include the second node 7 determining 470 a second node second private key ($V_{2S}$) based on the second node master private key (V is) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S}=V_{1S}+GV \quad \text{(Equation 13.1)}$$

$$V_{2S}=V_{1S}+SHA\text{-}256(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S=V_{2S}\times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S=V_{2C}\times P_{2S} \quad \text{(Equation 11)}$$

$$S=V_{2C}\times(V_{2S}\times G)$$

$$S=(V_{2C}\times V_{2S})\times G \quad \text{(Equation 15)}$$

Turning to the common secret (CS) determined by the second node 7, Equation 12.1 can be substituted into Equation 14 as follows:

$$S=V_{2S}\times P_{2C} \quad \text{(Equation 14)}$$

$$S=V_{2S}\times(V_{2C}\times G)$$

$$S=(V_{2S}\times V_{2C})\times G \quad \text{(Equation 16)}$$

Since ECC algebra is commutative, Equation 15 and Equation 16 are equivalent, since:

$$S=(V_{2C}\times V_{2S})\times G=(V_{2S}\times V_{2C})\times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7. This communication may be used to convey part of a private key, a representation of or identifier for a private key, or mnemonic for a private key. Therefore, once the invention has been used during set-up of, for example, a digital wallet or other controlled resource, secure communication between the parties can be performed thereafter.

The common secret (CS) may be in the form of an elliptic curve point (xs, ys). This may be converted into a standard key format using standard publicly known operations agreed by the nodes 3, 7. For example, the xs value may be a 256-bit integer that could be used as a key for AES256 encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method, comprising:
    determining a common secret at a first node in a network based, at least in part, on a first node private key of the first node and a second node public key of a second node in the network;
    using the common secret to transmit at least one share of a verification element that has been split into at least three shares to the second node to enable the second node to use the at least one share of the verification element to compute the verification element, wherein the verification element is usable to control access to a digital wallet associated with a user; and
    storing the at least three shares of the verification element at different locations relative to each other, wherein a first share of the at least three shares is stored in or on a back-up or safe-storage facility that is separate, independent, and/or distinct from the locations in which other shares of the at least three shares are stored, and wherein the back-up or safe-storage facility is, or is operated by, a party that is independent of at least the first node and the user, and that accepts responsibility for storing the share and supplying it upon request, and wherein a second share of the at least three shares is stored at a user device associated with the user and the digital wallet.

2. The method of claim 1, wherein the verification element comprises:
    a representation of a cryptographic key different from the cryptographic key; or
    one or more elements that may be used to obtain the cryptographic key.

3. The method of claim 1, wherein using the common secret to transmit the at least one share of the verification element comprises:
    using the common secret to generate an encryption key; and
    transmitting the at least one share of the verification element in an encrypted format using the encryption key.

4. The method of claim 1, wherein the verification element is a cryptographic key.

5. The method of claim 1, further comprising:
    splitting the verification element into the plurality of shares such that the verification element can be restored or regenerated from two or more shares of the plurality of shares, wherein no individual share of the plurality of shares is sufficient to restore or regenerate the verification element.

6. The method of claim 5, wherein Shamir's Secret Sharing Scheme is utilized as part of splitting the verification element into the plurality of shares.

* * * * *